(12) United States Patent
Croft

(10) Patent No.: US 10,311,045 B2
(45) Date of Patent: Jun. 4, 2019

(54) AGGREGATION/EVALUATION OF HETEROGENIC TIME SERIES DATA

(71) Applicant: Microsoft Technology Licensing, LLC, Redmond, WA (US)

(72) Inventor: Jeffrey Deane Croft, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 14/605,801

(22) Filed: Jan. 26, 2015

(65) Prior Publication Data

US 2016/0217160 A1 Jul. 28, 2016

(51) Int. Cl.
*G06F 16/23* (2019.01)
*G06F 16/2458* (2019.01)
*G06F 17/30* (2006.01)

(52) U.S. Cl.
CPC ...... *G06F 16/2379* (2019.01); *G06F 16/2477* (2019.01); *G06F 17/30377* (2013.01); *G06F 17/30551* (2013.01)

(58) Field of Classification Search
CPC ......... G06F 17/30551; G06F 17/30377; G06F 16/2379; G06F 16/2477
USPC ...................................................... 707/756
See application file for complete search history.

(56) References Cited

U.S. PATENT DOCUMENTS

| | | | |
|---|---|---|---|
| 6,449,588 B1 * | 9/2002 | Bowman-Amuah | H04L 41/0604 703/17 |
| 7,272,660 B1 | 9/2007 | Powers et al. | |
| 7,376,969 B1 * | 5/2008 | Njemanze | G06F 21/55 709/224 |
| 7,631,065 B2 | 12/2009 | Schweitzer et al. | |
| 7,707,203 B2 | 4/2010 | Hyder et al. | |
| 7,752,301 B1 | 7/2010 | Maiocco et al. | |
| 8,112,399 B2 | 2/2012 | Buros et al. | |
| 8,612,572 B2 | 12/2013 | Hayes et al. | |
| 8,731,966 B2 | 5/2014 | Breitenstein et al. | |
| 9,020,222 B2 * | 4/2015 | Wiets | G06Q 50/24 382/128 |

(Continued)

OTHER PUBLICATIONS

"QED Financial System", Retrieved on: Dec. 17, 2014, Available at: http://www.qedfs.com/wp-content/uploads/2014/09/QEDforFamilyOffices.pdf.

(Continued)

*Primary Examiner* — Phong H Nguyen
(74) *Attorney, Agent, or Firm* — Workman Nydegger

(57) ABSTRACT

The collection and aggregation of time series data from a variety of heterogenic time series data sources. This may be accomplished through the use of multiple collector modules, each configured to gather time series data from a different time series data source, and translate that time series data from its original format into a common format. An evaluation module applies one or more expressions against the time series data in the common format in order to identify one or more operations to perform, such as alerting, reporting, actuating, and so forth. Accordingly, the principles describe herein allow real world information to be gather and acted upon even when the time series data is gathered from disparate sources. Furthermore, different systems can rely upon the actions being consistent based on access to the same underlying data.

17 Claims, 3 Drawing Sheets

(56) References Cited

U.S. PATENT DOCUMENTS

| | | | |
|---|---|---|---|
| 9,380,060 B2* | 6/2016 | Dubois | H04L 67/141 |
| 2007/0043762 A1* | 2/2007 | Tandon | G01R 31/318511 |
| | | | 707/999.103 |
| 2007/0139218 A1* | 6/2007 | Bovankovich | G01D 4/004 |
| | | | 340/870.02 |
| 2011/0119298 A1* | 5/2011 | Arrasvuori | G06F 17/30867 |
| | | | 707/769 |
| 2012/0130987 A1 | 5/2012 | Bose et al. | |
| 2013/0129167 A1* | 5/2013 | Wiets | G06Q 50/24 |
| | | | 382/128 |
| 2013/0138601 A1 | 5/2013 | Mahalanabis | |
| 2014/0012901 A1 | 1/2014 | Ruhl et al. | |
| 2014/0068348 A1 | 3/2014 | Mondal et al. | |
| 2014/0081611 A1* | 3/2014 | Robertson | G06T 17/05 |
| | | | 703/6 |
| 2014/0095214 A1 | 4/2014 | Mathe et al. | |
| 2014/0207592 A1* | 7/2014 | Kavis | G06Q 40/12 |
| | | | 705/21 |
| 2015/0189005 A1* | 7/2015 | Dubois | H04L 67/141 |
| | | | 709/217 |

OTHER PUBLICATIONS

Nguyen, et al., "Sense & Response Service Architecture (SARESA): An Approach towards a Real-time Business Intelligence Solution and its use for a Fraud Detection Application", In Proceedings of ACM 8th International Workshop on Data Warehousing and OLAP, Nov. 4, 2005, pp. 77-86.

\* cited by examiner

AGGREGATION/EVALUATION OF HETEROGENIC TIME SERIES DATA

BACKGROUND

The amount of information available to users over the Internet or via corporate networks is practically limitless, which is why today's era is often termed the "information age". One challenge associated with the information age is sifting through mountains of data in order to find information of relevance. There are a variety of conventional mechanisms for finding this proverbial needle in a haystack.

One type of information that is available in abundance is time series data, in which information is associated with a particular time. For instance, events or log entries are often each associated with a time. There are, however, a number of sources of time series data. Each source may represent time in different ways, and present associated data in different formats. It seems that almost every year, there is a new system for alerting, reporting, or monitoring such time series data. Frequently, it is a different system supporting each, in addition to presenting the time series data in different formats.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the collection and aggregation of time series data from a variety of heterogenic time series data sources. This may be accomplished through the use of multiple collector modules, each configured to gather time series data from a different time series data source, and translate that time series data from its original format into a common format. An evaluation module applies one or more expressions against the time series data in the common format in order to identify one or more operations to perform, such as alerting, reporting, actuating, and so forth. Accordingly, the principles described herein allow real world information to be gathered and acted upon even when the time series data is gathered from disparate sources. Furthermore, different systems can rely upon the actions being consistent based on access to the same underlying data.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the collection and aggregation of time series data from a variety of heterogenic time series data sources. This may be accomplished through the use of multiple collector modules, each configured to gather time series data from a different time series data source, and translate that time series data from its original format into a common format. An evaluation module applies one or more expressions against the time series data in the common format in order to identify one or more operations to perform, such as alerting, reporting, actuating, and so forth. Accordingly, the principles described herein allow real world information to be gathered and acted upon even when the time series data is gathered from disparate sources. Furthermore, different systems can rely upon the actions being consistent based on access to the same underlying data. Some introductory discussion of a computing system will be described with respect to FIG. 1. Then, the structure and operation of embodiments described herein will be presented with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
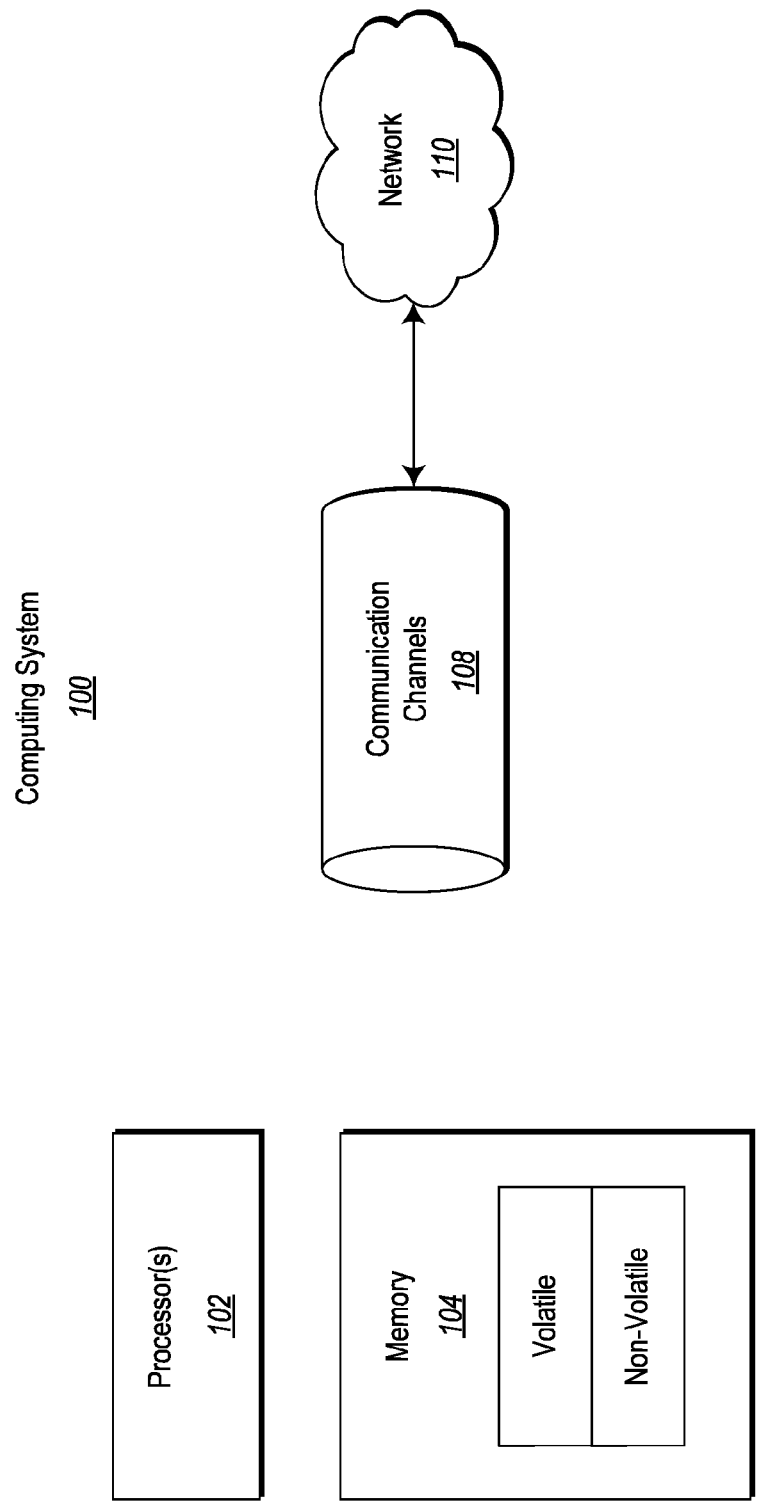
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
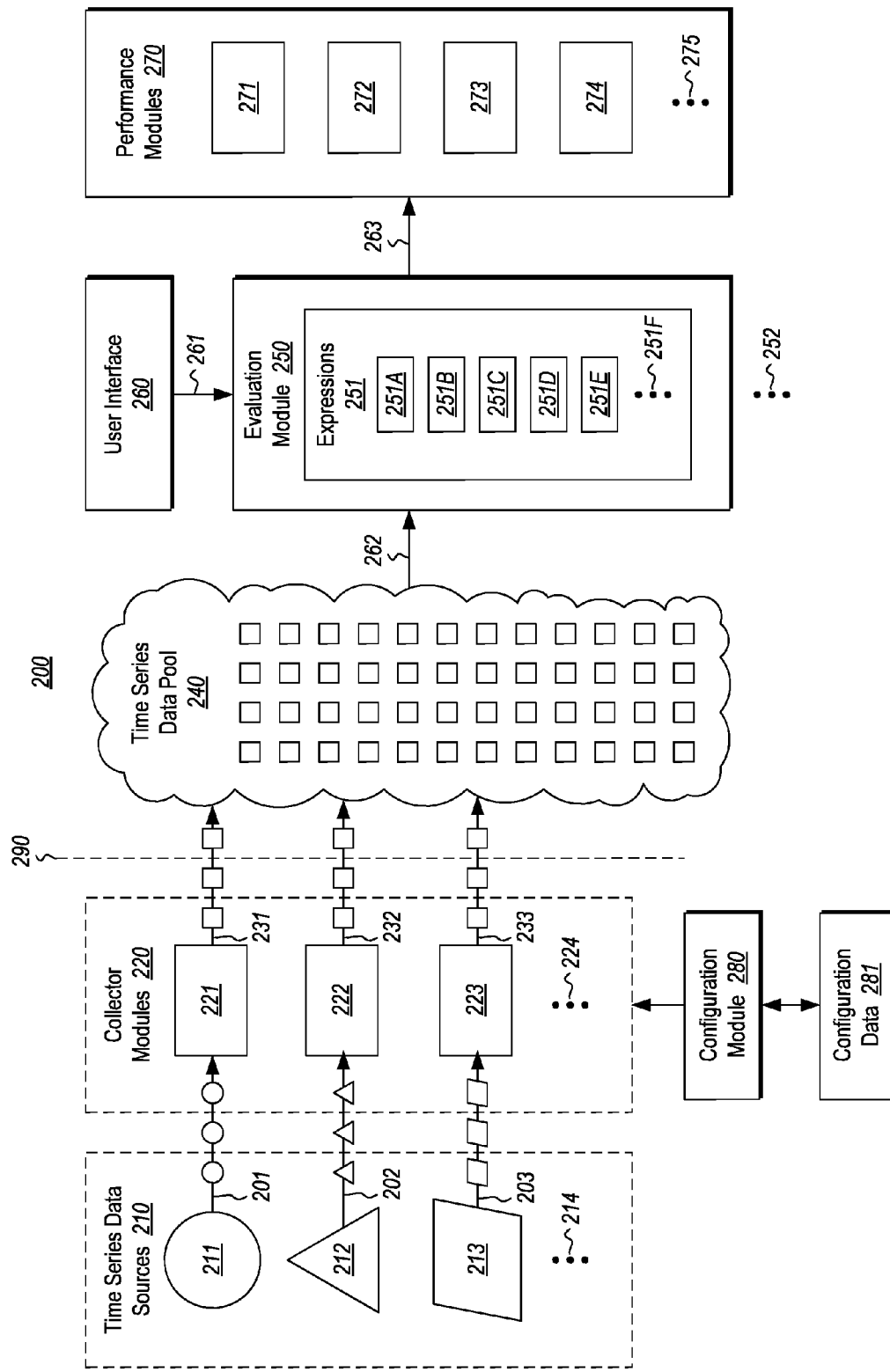
FIG. 2 abstractly illustrates a collection and evaluation environment in which the principles described herein may be employed.

FIG. 2 illustrates a collection and evaluation environment 200 in which the principles described herein may be employed. The illustrated modules and data sources may be software modules implemented in a computing system such as the computing system 100 of FIG. 1. Alternatively, or in addition, the illustrated modules and data sources may be implemented through the use of hardware, firmware, or any combination of hardware, software, and/or firmware.

The environment 200 includes multiple collectors 220 that collect data from multiple time series data sources 210. In the illustrated embodiment, there are three time series data sources 211, 212 and 213 illustrated. However, the ellipses 214 represent that the principles described herein may apply to any environment in which there are multiple time series data sources. There is no restriction on the time series data sources. They may or may not be external to the computing system that evaluates the time series data. For instance, a time series data source may be generated internal to the computing system, may be within a local area network, might be external to the enterprise that operates the computing system, or may be generated within a public, private, or hybrid cloud computing environment.

The time series data sources are illustrated as being different shapes to abstractly represent that each time series data source is of a different type and provides time series data in a different format. For instance, the first time series data source 211 is represented as a circle and generates first time series data 201 of a first type and a first format as represented by an arrow with intermittent smaller circles dispersed thereon. The second time series data source 212 is represented as a triangle and generates time series data 202 of a second type and a second format as represented by an arrow with intermittent smaller triangles dispersed thereon. The third time series data source 213 is represented as a parallelogram and generates third time series data 203 of a third type and a third format as represented by an arrow with intermittent smaller parallelograms dispersed thereon.

In some embodiments, a single data source illustrated in FIG. 2 may represent multiple physical data sources that generate time series data of a particular type or in the aggregate a particular plurality of types of time series data. For instance, consider that perhaps time series data source 211 might generate time series data of both a first type (e.g., represented by circles) and a second type (e.g., represented by triangles).

There is a collector module configured to collect time series data from each of the corresponding data sources. For instance, collector module 221 is configured to collect time series data of a first type from the first time series data source 211. Similarly, collector modules 222 and 223 are respectively configured to collect time series data of a second and third type, respectively, from a second and third time series data source 212 and 213, respectively. The ellipses 224 represent that there may be other collector modules that are configured to collect time series data from yet other time series data sources as represented by the ellipses 214.

Presently, there is an enumerable variety of different time series data sources and formats in present use. Examples of current time series data sources include synthetic transaction frameworks, system monitoring solutions such as MS Systems Center Operation Manager, databases such as MSSQL, proprietary service monitoring services such as Metron, log data, and so forth. However, the principles described herein may operate upon any time series data source whether presently existing or whether yet to be developed. The principles described herein have particular utility in gathering and placing such time series data in a common format for universal evaluation.

Each collector module 220 is configured to translate the respective time series data into a corresponding time series data of a common format. For instance, regardless of the type of time series data being received at the collector module, the collector module generates a time series data of a common output format. For instance, collector module 221 generates output time series data 231 which is represented by an arrow with overlapping small squares interspersed thereon. Likewise, collection modules 222 and 223 each likewise generate respective time series data 232 and 233 which are also represented by arrows with overlapping small squares interspersed thereon. Such time series data of the common format may be provided into a pool of time series data 240 that is of a common format.

An evaluation module 250 has a set of expressions 251 that are run against (as represented by arrow 262) the pool of time series data 240 in the common format to determine one or more actions to perform. As an example, the expressions include expressions 251A, 251B, 251C, 251D, 251E amongst potentially many others as represented by the ellipses 251F.

The format of the time series data from disparate data sources is more canonical and thus it is now easier to form expressions that are evaluated against the pool of time series data 240. Accordingly, users can more easily interact with a user interface module 260 for purposes of entering or otherwise building expressions in a more intuitive way, without having to have knowledge of the underlying data formats of the heterogenic data sources 210. Accordingly, the user interface module 260 is configured to gather input from a user to thereby generate one or more expressions to be applied by the evaluation module 250, and communicate the one or more expressions to the evaluation module 250 as represented by arrow 261. Furthermore, all of the evaluations have available the same pool of time series data 240. Thus, inconsistent results that stem from evaluating different pools of data is avoided.

A performance module set 270 may also be provided in order to take the actions decided by the evaluation module 250. For instance, the performance module set 270 includes performance modules 271 through 274, although the ellipses 275 represent that there may be any number of perform modules that take any number of actions as determined by the evaluation module 250. For instance, one performance module might be an altering module that performs an alert if an expression is evaluated to result in an alert. Another performance module might be a reporting module that generates a periodic report by evaluating the pool of time series data 240. Another performance module might be an actuation module that causes some mechanism actuation to be performed based on an evaluation of the evaluation module 250. However, the principles described herein are not limited to the type of actions that may be taken.

In one embodiment, the collector modules 220 may be dynamically linkable modules, and perhaps may simply be instances of the same class. In that case, when a newly available time series data source is to be added to the collection environment 200, an instance of the collector module may be created and configured by a configuration module 280 using configuration data 281. The configuration data describes the schema for a wide variety of types of time series data, and can be used by the configuration module 280 to configure the collector module to translate a corresponding type of time series data in a corresponding format into the common time series data format.

For instance, the configuration data 281 might indicate what the schema of the time is within the time series data source. The collector module may inherently understand the schema of the common time series data. Accordingly, from this, the collector module may be able to convert the time into a common format. The configuration data 281 may also specify the schema of the remaining data within the time series data format, and perhaps indicate how that schema is to be mapped into the schema of the common time series data format.

Figure 3:
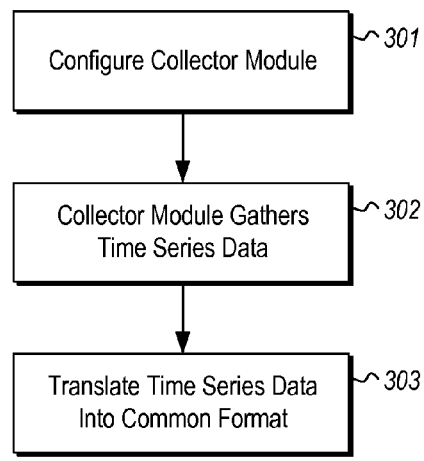
FIG. 3 illustrates a flowchart of a method for collecting time series data from multiple heterogenic time series data source.

FIG. 3 illustrates a flowchart of a method 300 for collecting time series data from multiple heterogenic time series data source. As the method 300 may be performed in the environment 200 of FIG. 2, the method 300 of FIG. 3 will now be described with respect to the environment 200 of FIG. 2. That said, the method 300 is not confined to any particular environment.

The method 300 is performed for each of multiple types of time series data. Specifically, a configuration module uses appropriate configuration data to configure a collector module to gather and translate time series data of a first type (act 301). Thus, the collector modules need not be of a class that is specifically authored towards a particular time series data type, but instead may be a generic class that has its instances configured to operate with the particular time series data type. In one embodiment, the collector modules may be dynamically linkable (such as a component of dynamic link library).

For instance, with reference to FIG. 2, the configuration module 280 may use configuration data 281 to configure the collector module 221 to gather and translate the time series data being received (as represented by arrow 201) from the time series data source. The collector module then gathers the appropriate time series data of the appropriate type and format (act 302). For instance, in FIG. 2, the collector module 221, being properly configured, may now gather the time series data (as represented by arrow 201) from the time series data source 211. The collector module than translates the time series data into a resulting format (act 303). For instance, in FIG. 2, the collector module 221 translates the time series data 201 into the time series data 231.

Similarly, the method 300 may be performed with respect to each of the other time series data sources 212 and 213. For instance, the configuration module 280 uses appropriate configuration data 281 to configured the collector module 222 and 223 to gather and translate time series data of a second and third type (act 301), respectively. The collector module 222, being properly configured, may now gather the time series data (as represented by arrow 202) from the time series data source 212 (act 302), and translate that time series data into the resulting format (act 303). Also, the collector module 223, being properly configured, may now gather the time series data (as represented by arrow 203) from the time series data source 213 (act 302), and translate that time series data into the resulting format (act 303).

The result of this gathering operation is a pool of time series data 240 of a common type and format. Line 290 represents that there may be one or more additional transformations prior to final representation in the time series data pool 240. For instance, there may be filtering operations, or any further evaluations that are performed in order to determine how to represent the time series data within the time series data pool. In one embodiment, the collector modules 221 through 223 each provide their resulting collected time series data into a corresponding intermediate pool (not shown). An intermediate evaluation module may then evaluate expressions upon the individual intermediate evaluation stores to generate data and provide the same into the time series data pool 240.

The time series data pool 240 has time series data of a common type and format may be used by a wide-variety of evaluation modules. For instance, the evaluation module 250 may use the pool of time series data 240. The evaluation module 250 may evaluate expressions 251 against the entire pool of time data pool 240. Such evaluation may be upon live data as it is being received by the time series data pool 240, or may be upon historical data that has been within the time series data pool 240 for some time. The time series data pool 240 may include any type of time series data. Some might have expiry times. Others may be persisted virtually indefinitely. The time series data might be gathered from any source and may include any data that has an associated time. For instance, the time series data may be change events recovered from a log.

The ellipses 252 represent that there may be other evaluation modules that operate upon the time series data pool 240 to generate their own resulting actions. However, the actions between the different evaluation modules are at least consistent to the extent that they are operating on the same core nucleus of data. Accordingly, the actions taken are more likely to be consistent.

Figure 4:
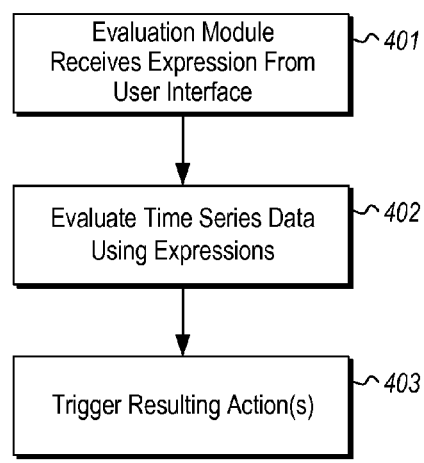
FIG. 4 illustrates a flowchart of a method for an evaluation module to operate upon the time series data pool to identify actions to be taken.

FIG. 4 illustrates a flowchart of a method 400 for an evaluation module to operate upon the time series data pool 240. For instance, the method 400 may be performed by the evaluation module 250 of FIG. 2, or really any of the evaluation modules of FIG. 2 (including those abstractly represented by the ellipses 252). Accordingly, the method 400 of FIG. 4 will again be described with frequent reference to the environment 200 of FIG. 2.

The evaluation module receives one or more expressions to be applied to the time series data pool from a user interface (act 401). For instance, the evaluation module 250 may receive one or more of the expressions 251 from the user interface 260. The user interface in turn formulated the expression via interaction with a user.

The expression evaluation module then evaluates (act 402) the time series data pool using the expressions, and triggers one or more resulting actions (act 403). For instance, in FIG. 2, the evaluation module 250 may use one or more of the evaluations 251 in order to evaluate the time series data pool 240. The evaluation module 250 may for instance evaluated translated forms of data from each of the collectors 221, 222 and 223. The evaluation module then triggers (as represented by arrow 263) one or more of the performance modules 270 to perform a resulting action. For instance, as previously mentioned, the resulting action might include generating an alert or report, or perhaps actuating a mechanism.

Accordingly, the principles described herein provide an efficient mechanism for aggregating and collecting time series data in a consistent format such that altering, monitoring, and reporting systems can be built conveniently on top of the aggregated data. Thus, such systems can report consistently based on evaluations of the same underlying data, even though the expressions that will be evaluated may be different between different altering, monitoring and reporting systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of improving the efficiency of a computing system using time series data to determine one or more actions to be taken based on the time series data, wherein the method is performed by one or more processors executing computer-executable instructions for the method, and the method comprising acts of:

performing a single translation of a first time series data of a first type at a first collector module;

performing a single translation of a second time series data of a second type at a second collector module; and wherein:

the first and second types of time series data are obtained from different heterogenic data sources that use different formats;

the first and second types of time series data are translated from respective first and second formats used by the different heterogenic data sources from which the first and second types of time series data are obtained, into corresponding time series data that are searchable based on having a common format;

the translated first and second types of time series data are then ready for storage without further translation; and the first and second collector modules are dynamically linked and each comprise a schema used to translate the corresponding first and second formats of the first and second collector modules into the common format for the searchable time series data;

storing the corresponding searchable time series data having the common format in a data pool;

based on input from a user, generating one or more expressions applied to at least some of the stored corresponding searchable time series data, wherein the one or more expressions are generated based on the common format in order to facilitate building the expressions in a more intuitive way and without reference to the different formats used by the different heterogenic data sources;

based on the one or more applied expressions retrieving from the data pool at least some of the corresponding searchable time series data having the common format; and using the one or more expressions, evaluating the retrieved searchable time series data using the common format of the time series data to determine one or more resulting actions to perform;

wherein the evaluation of the time series data is performed without reference to the different formats used by the different heterogenic data sources in order to reduce inconsistent results; and performing one or more of the resulting actions.

2. The method in accordance with claim 1, further comprising acts of:

gathering from a third heterogenic data source time series data of a third type and having a third format;

translating the time series data of the third type from the third format into corresponding searchable time series data having the common format, and storing the searchable corresponding time series data for the third type of time series data in the data pool; and wherein evaluating the retrieved time series data comprises evaluating at least some the third corresponding time series data for the third type of time series data.

3. The method in accordance with claim 1, wherein the one or more resulting actions comprise generating an alert.

4. The method in accordance with claim 1, wherein the one or more resulting actions comprise generating a report.

5. The method in accordance with claim 1, wherein the schema comprises a first schema used to configure the first type of times series data gathered prior to translation of the first type of time series data, and a second schema used to configure the second type of time series data gathered prior to translation of the second type of time series data.

6. The method in accordance with claim 1, wherein at least one of the first and second types of time series data is external to an enterprise system in which the first and second collector modules operate.

7. The method in accordance with claim 5, wherein the first collection module and the second collection module use the respective first and second schemas to translate the first and second types of time series data, respectively, into the common format.

8. The method in accordance with claim 1, wherein the input from the user generating one or more expression to be applied is input at a user interface, and wherein evaluating the retrieved first and second plurality of time series data provided by the first and second collector modules to determine the one or more resulting actions is performed by an evaluation module that receives the one or more expressions input by the user at the user interface.

9. The method in accordance with claim 1, wherein at least one of the first and second types of time series data is live data.

10. The method in accordance with claim 1, wherein at least one of the first and second types of time series data is historical data.

11. The method in accordance with claim 1, wherein at least one of the first and second types of time series data are change history records.

12. The method in accordance with claim 1, wherein at least one of the first and second types of time series data are log records.

13. A computer program product comprising one or more computer-readable storage media having thereon computer-executable instructions that are structured such that, when executed by one or more processors of a computing system, cause the computing system to perform a method of improving the efficiency of a computing system using time series data to determine one or more actions to be taken based on the time series data, wherein the method is performed by one or more processors executing computer-executable instructions for the method, and the method comprising acts of:

performing a single translation of a first time series data of a first type at a first collector module;

performing a single translation of a second time series data of a second type at a second collector module; and wherein:

the first and second types of time series data are obtained from different heterogenic data sources that use different formats;

the first and second types of time series data are translated from respective first and second formats used by the different heterogenic data sources from which the first and second types of time series data are obtained, into corresponding time series data that are searchable based on having a common format;

the translated first and second types of time series data are then ready for storage without further translation; and the first and second collector modules are dynamically linked and each comprise a schema used to translate the corresponding first and second formats of the first and second collector modules into the common format for the searchable time series data;

storing the corresponding searchable time series data having the common format in a data pool;

based on input from a user, generating one or more expressions applied to at least some of the stored corresponding searchable time series data, wherein the one or more expressions are generated based on the common format in order to facilitate building the expressions in a more intuitive way and without reference to the different formats used by the different heterogenic data sources;

based on the one or more applied expressions retrieving from the data pool at least some of the corresponding searchable time series data having the common format; and using the one or more expressions, evaluating the retrieved searchable time series data using the common format of the time series data to determine one or more resulting actions to perform;

wherein the evaluation of the time series data is performed without reference to the different formats used by the different heterogenic data sources in order to reduce inconsistent results; and performing one or more of the resulting actions.

14. A computing system comprising:

one or more processors;

a memory containing computer-executable instructions which, when executed by the one or more processors, cause the computing system to operate with an architecture for a collection and evaluation environment that performs a method of improving the efficiency of a computing system using time series data to determine one or more actions to be taken based on the time series data, and wherein the method performed by the architecture comprises:

performing a single translation of a first time series data of a first type at a first collector module;

performing a single translation of a second time series data of a second type at a second collector module; and
wherein:
the first and second types of time series data are obtained from different heterogenic data sources that use different formats;
the first and second types of time series data are translated from respective first and second formats used by the different heterogenic data sources from which the first and second types of time series data are obtained, into corresponding time series data that are searchable based on having a common format;
the translated first and second types of time series data are then ready for storage without further translation; and
the first and second collector modules are dynamically linked and each comprise a schema used to translate the corresponding first and second formats of the first and second collector modules into the common format for the searchable time series data;
storing the corresponding searchable time series data having the common format in a data pool;
based on input from a user, generating one or more expressions applied to at least some of the stored corresponding searchable time series data, wherein the one or more expressions are generated based on the common format in order to facilitate building the expressions in a more intuitive way and without reference to the different formats used by the different heterogenic data sources;
based on the one or more applied expressions retrieving from the data pool at least some of the corresponding searchable time series data having the common format; and
using the one or more expressions, evaluating the retrieved searchable time series data using the common format of the time series data to determine one or more resulting actions to perform;
wherein the evaluation of the time series data is performed without reference to the different formats used by the different heterogenic data sources in order to reduce inconsistent results; and
performing one or more of the resulting actions.

15. The system in accordance with claim 14, wherein the method performed by the architecture further comprises:
gathering from a third heterogenic data source time series data of a third type and having a third format;
translating at the one or more collector modules the time series data of the third type from the third format into searchable corresponding time series data having the common format, and storing the searchable corresponding time series data for the third type of time series data in the data pool; and
wherein evaluating the retrieved time series data at the evaluation module comprises evaluating at least some the third corresponding time series data for the third type of time series data.

16. The system in accordance with claim 14, wherein the schema comprises a first schema used to configure the first type of times series data gathered prior to translation of the first type of time series data, and a second schema used to configure the second type of time series data gathered prior to translation of the second type of time series data.

17. The system in accordance with claim 16, wherein the first collection module and the second collection module use the respective first and second schemas to configure the first and second types of time series data, respectively.

* * * * *